United States Patent [19]
Kuehn

[11] 3,930,640
[45] Jan. 6, 1976

[54] METHOD OF PREPARING MOLDABLE PLASTIC AND ADDITIVE AGENTS

[75] Inventor: Jack W. Kuehn, Wayzata, Minn.

[73] Assignee: Tote Bulk Handling, Inc., Wayzata, Minn.

[22] Filed: Dec. 19, 1974

[21] Appl. No.: 534,441

Related U.S. Application Data

[62] Division of Ser. No. 353,468, April 23, 1973.

[52] U.S. Cl. .............................................. 259/185
[51] Int. Cl.² .......................................... B29B 1/04
[58] Field of Search ........... 259/191, 185, 186, 192, 259/193, 1 R; 264/141, 140, 142, 143

[56] References Cited
UNITED STATES PATENTS

| | | | |
|---|---|---|---|
| 2,464,746 | 3/1949 | Gerling | 264/141 |
| 2,904,827 | 9/1959 | Kaiser | 264/141 |
| 2,918,701 | 12/1959 | Hull | 264/142 |
| 3,509,247 | 4/1970 | Perrone | 264/131 |

*Primary Examiner*—Robert W. Jenkins

[57] ABSTRACT

A method is disclosed for preparing mixtures of moldable plastic and a suitable amount (generally a minor amount) of additive material to be dispersed throughout the moldable plastic, which mixtures are intended for subsequent use in a plastic molding process, by a method which permits separation or re-classification of the mixture into its moldable plastic and additive material components in the event that the mixture turns out to be incorrect or obsolete. The method includes the steps of obtaining small pellets of a moldable plastic having a first shape, these pellets being substantially free of the additive material. These small pellets of moldable plastic are then mixed with small pellets of moldable plastic into which has been incorporated one or more additives, these pellets having a second shape which is classifiably different from the shape of the other plastic pellets.

6 Claims, 2 Drawing Figures

METHOD OF PREPARING MOLDABLE PLASTIC AND ADDITIVE AGENTS

CROSS-REFERENCE TO RELATED APPLICATIONS

This application is a divison of my co-pending U.S. Application Ser. No. 353,468, filed Apr. 23, 1973.

BACKGROUND OF THE INVENTION

In the plastic molding arts, virgin plastic which is to be molded is commonly used in the form of small plastic pellets. These pellets are conveniently formed by extruding plastic (typically a thermoplastic such as polyethylene) through a die to form a strand which is then severed into small lengths. For convenience, the dies are usually circular and extrusion produces cylindrical strands. However, other shapes of the small plastic pellets are known. After pelletizing, the moldable plastic can be shipped and stored in pellet form until the time of use. Pelletizing makes the plastic easy to handle and eliminates dust problems associated with powdered plastics. At the time of use, the pellets are melted and the resulting liquid plastic mass is molded and hardened.

As illustrative of the prior art related to the pelletizing of plastics, see the following U.S. Pat. Nos: 2,464,746 2,918,701 3,509,247

When colored plastic articles are desired, a small amount of pigment or other coloring agent (e.g. 1% of coloring agent based upon the weight of the plastic) is added to the virgin plastic pellets and the two are mixed together before or at the time the pellets are melted and molded. For convenience, it is common in the plastic molding industry to use coloring agents in the form of color concentrates. These color concentrates can be formed by pre-blending large amounts of coloring agent with a relatively small amount of plastic (e.g. a thermoplastic such as polyethylene) so that the resulting color-rich plastic can be extruded and pelletized in the ordinary manner. In this way, the dust problems and other problems (measuring problems) associated with the use of pure coloring agents can be avoided.

In large commercial operations, it is common to mix large amounts of uncolored virgin plastic pellets with a color producing amount of color concentrate pellets to provide a ample constant source of supply to the plastic molding operations. However, if the pellets are incorrectly mixed, or if it is desired to change to a different color of plastic, unused mixtures of uncolored plastic pellets with color concentrate pellets which are of the old color are considered, and sold or disposed of as, "scrap" and are often used only in the manufacture of low priced products for other purposes. In any event, these obsolete mixtures must be stored until they can either be used or disposed of as scrap. This is because there is no commercially economical method for separating the color concentrate pellets from the uncolored plastic pellets. The two types of pellets are generally virtually identical in every way except color.

It is also common to mix different types of pellets when the types differ as to other characteristics besides color, e.g. filled vs. unfilled plastic, treated vs. untreated plastic, etc. Here again, incorrect or obsolete mixtures are likely to be scrap.

SUMMARY OF THE INVENTION

The present invention is based upon the discovery that the large amounts of scrap "premix" can be avoided if the shape of the uncolored or untreated or unfilled plastic pellets (hereinafter referred to as "additive-poor pellets") is classifiably different from the shape of the colored, filled, or treated pellets (hereinafter referred to as the "additive-rich" or "additive concentrate" pellets). These differences in shape allow the two types of pellets to be separated by known classification methods (e.g. screening) if separation is desired.

For purposes of illustration, the "additive-poor" pellet is an uncolored pellet in the description which follows. The additive concentrate pellet is therefore a color concentrate pellet.

Figure 1:
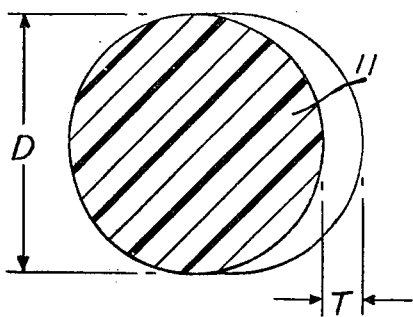
FIG. 1 is a cross-sectional view, on a greatly enlarged scale, of a cylindrical plastic pellet used in this invention as the uncolored pellet.

It should be understood that the two Figures of the Drawing are merely exemplary. Other shapes could be used, and the illustrated shapes could, less preferably, be reversed. For example, clear plastic pellets can have the shape illustrated in FIG. 2 and colored pellets can have the shape of FIG. 1.

Figure 2:
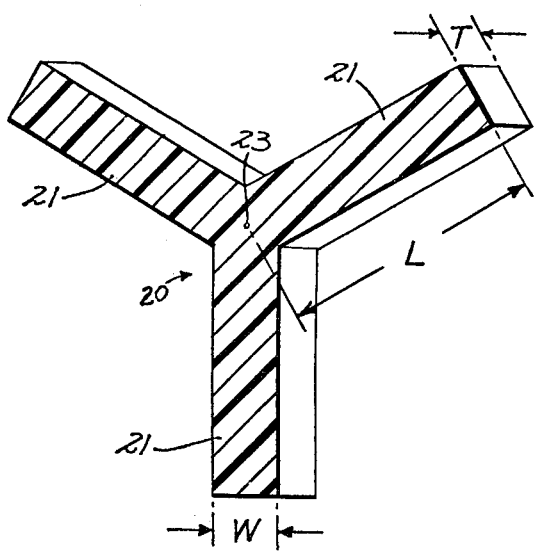
FIG. 2 is a cross-sectional view, on the same scale as FIG. 1, of a fluted or Y-shaped plastic pellet used in this invention, preferably as the color concentrate pellet.

The color-poor, untreated virgin plastic pellet 11 of FIG. 1 has a diameter D which, in the example illustrated, is ⅛ inch or 125 mils. The length or thickness (T) of pellet 11 is the same as the length or thickness (T) of color-rich pellet 20 of FIG. 2. Thickness dimension T is typically at least as long as D but has been foreshortened for convenience of illustration. Pellet 20 is star- or Y-shaped (i.e. fluted) and has three legs 21 of length L branching out from a central point 23. This configuration presents a much larger apparent cross section to the classifying device. In the example illustrated, the length L of legs 21 (measured from central point 23) is about 130.2 mils (0.130208 inches) and the width W of each leg is 31.25 mils (1/32 of an inch). Thus, a vibrating sieve opening which would pass about 100% of a mass of pellets similar to pellet 11 would have to be roughly doubled in width to pass about 100% of pellets similar to pellet 20. Furthermore, even though the length of pellets 11 and 20 is the same, the surface area of the fluted shape (pellet 20) is larger than the area of a cylinder having the dimensions of pellet 11. With the densities, lengths, and true cross-sectional areas of pellets 11 and 20 arranged to be generally the same, each pellet comprises about the same weight of material. Due to the aforementioned similarity in weight of material in each type of pellet, there is little or no tendency for a mass of pellets 11 to separate from a mass of pellets 20 (by segregation or stratification) prior to classification or re-classification.

The greater surface area of pellet 20 has several additional advantages besides ease of re-classification into the additive-rich pellet class, particularly when the pellet 20 is the color concentrate pellet and pellet 11 is the uncolored pellet. For example, color concentrate pellets of shape 20 will melt faster (due to increased heat absorption), thereby dispersing the color rapidly through the slower-melting mass of clear plastic pellets 11. The faster and better color dispersion is an aid to faster and better production of molded articles (e.g. faster extrusion rates). Furthermore, if there is any tendency toward stratification or segregation in a premix, the fluted shape of pellet 20 actually can help in preserving homogeneity prior to re-classification.

DETAILED DESCRIPTION

Uncolored Plastic Pellets

Typically, "additive-poor" plastic pellets of this invention are poor in or simply do not include a coloring agent. Clear or uncolored plastic pellets are commercially available and can be obtained from numerous sources. Such uncolored plastic pellets can have a variety of shapes. Generally, they are formed by extrusion techniques in which the strands of plastic which are formed during extrusion are chopped or otherwise severed to form small pellets. Typically, these pellets have lengths ranging between 1–15 millimeters (e.g. 3–10 millimeters or about 120–400 mils). Commonly, the cross-sectional shape of these strands is circular, although other shapes are known (e.g. triangular, square, fluted or star-shaped, spherical, flat, and the like). Occasionally, the pellets may be formed by techniques other than extrusion.

Numerous processes are known in the art for forming pellets of uncolored and color-poor plastics and the selection of a suitable pellet-forming process is an act within the skill of the art when aided by this disclosure.

For purposes of the present invention, it is preferred that the uncolored or color-poor plastic pellets be cylindrical in form. The cylindrical pellets are the most common in present commercial operations.

The pellets can be made from any plastic which is capable of being formed into a pellet and subsequently molded. A wide variety of plastics can be used. Some thermosetting plastics or resins can be used because their curing characteristics permit them to be preformed into pellets. However, it is more common to use thermoplastics such as polyethylene, polypropylene, polystyrene, and the like.

Color Concentrate Pellets

Typically, "additive concentrate" plastic pellets of this invention (i.e. pellets rich in some additive) are color concentrate pellets.

Color concentrate pellets are prepared by mixing a relatively large amount of coloring agent with a relatively small amount of plastic (e.g. by melting the plastic and blending the molten plastic with coloring agent) and thereafter forming pellets of the color concentrate. Again, the most convenient method of forming pellets is by the extrusion technique. However, other techniques can be used and shapes other than those derived from extruded strands can be effective.

For purposes of the present invention, it is essential that the shape of the color concentrate pellets be classifiably different from the shape of the uncolored plastic pellets described above. By "classifiably different" it is meant that the shape of the color concentrate pellets is sufficiently different from the shape of the uncolored plastic pellets to permit the two types of pellets to be separated from each other by one or more classification techniques (e.g. screening).

Suitable coloring agents are known in the art and the present invention is not critically dependent the selection of any particular coloring agent. Thus, a variety of pigments, dyes and the like can be used.

If mixtures of uncolored or color-poor plastic pellets and color concentrate pellets are to be subjected to a substantial amount of handling prior to being molded to produce an article of manufacture, there may be a tendency for the color concentrate pellets to aggregate or stratify or separate from the uncolored plastic pellets. For example, this can occur if there is a large difference in the relative sizes or densities of the two pellets and mixtures of the two are transported by truck or rail over long distances. To prevent or materially reduce such situations, it is helpful if the length of the uncolored plastic pellets and the length of the color concentrate pellets are approximately equal and if their actual cross-sectional areas are approximately equal (as shown in the Drawing). Note that when one of the pellets is circular in cross section (as in FIG. 1) and the other is star-shaped or Y-shaped or fluted, as in FIG. 2, there can be a substantial difference in surface area or apparent cross-sectional area even though their actual cross-sectional areas are identical.

Separation of additive-poor pellets from additive concentrate (e.g. color concentrate) pellets can be aided by manufacturing the pellets with different densities (either bulk density or true density) or by making the size or shape of the two types of pellets more and more dissimilar.

Classification Methods

Any one of a variety of classification methods can be used. In a given situation, all classification methods will not work with equal effectiveness. Some classification methods will be better suited to a given system because of inherent differences or similarities in size, shape, density and the like of the additive-poor plastic pellets and the additive concentrate pellets. Where possible, screening or sieving techniques are preferred because of their simplicity and economy. However, with some types of plastic pellets, other classification techniques may be desirable. Such other techniques include flotation or sedimentation in a liquid medium and specific gravity air separators.

Other Treatments or Additives Besides Coloring Agents

As will be apparent to those skilled in the art, situations arise wherein it can be desirable to mix substantially pure thermoplastic pellets with highly extended or filled plastic pellets, relatively unplasticized pellets with highly plasticized pellets, pellets containing blowing agent with pure plastic pellets, hydrophilic pellets with hydrophobic or oleophilic pellets, etc. In every case there is generally a bulk material which is poor in or untreated or relatively untreated with the additive material, and additive concentrate pellets, which are rich in the additive material and are to be dispersed throughout the bulk material. The most common situation, as pointed out previously, involves a minor amount of colored pellets mixed with the overwhelming bulk of pellets which are uncolored (e.g. clear plastic).

What is claimed is:
1. The method of preparing a mixture of moldable plastic and an additive amount of additive material to be dispersed throughout the moldable plastic, which mixture is intended for subsequent use in a plastic molding process, which method includes the steps of:
   a. obtaining small, additive-poor pellets comprising a first moldable plastic composition, said pellets hav- ing a first shape;

b. obtaining small, additive concentrate pellets comprising a second moldable plastic composition, said second moldable plastic composition being rich in an additive material, at least as compared to said first moldable plastic composition, said pellets having a second shape which is readily classifiably different from said first shape; and c. intentionally mixing plastic pellets of said first shape with a minor amount of pellets of said second shape, for purposes of obtaining a mixture which can be subsequently separated such that said additive-poor pellets are separated from said additive-concentrate pellets, the amount of pellets of said second shape being sufficient to impart a desired additive characteristic to the mixture of pellets, when the pellets have been fused and molded.

2. The method of claim 1 in which the pellets of steps (a) and (b) are of approximately equal length and of approximately equal cross-sectional area.

3. The method of claim 1 in which the densities of the pellets of steps (a) and (b) are different.

4. The method of claim 1 in which the pellets of step (a) are cylindrical and are substantially free of coloring agent.

5. The method of claim 4 in which the pellets of step (b) are fluted and in which the lengths and cross-sectional areas of the pellets of steps (a) and (b) are approximately equal.

6. The method of claim 5 in which the plastic is polyethylene.

* * * * *